United States Patent [19]

Nakano et al.

[11] Patent Number: 5,218,885
[45] Date of Patent: Jun. 15, 1993

[54] ENGINE BALANCING AND IMPROVEMENTS THEREOF

[75] Inventors: Shinichi Nakano; Hiroyuki Kawakubo; Toshio Shimada, all of Saitama; Hiroshi Wakoh, Tokyo, all of Japan

[73] Assignee: Honda Giken Kogyo Kabushiki Kaisha, Tokyo, Japan

[21] Appl. No.: 767,785

[22] Filed: Sep. 27, 1991

[30] Foreign Application Priority Data

Oct. 18, 1990 [JP] Japan ................................ 2-280152

[51] Int. Cl.⁵ ............................................... F16C 3/04
[52] U.S. Cl. ............................................ 74/591; 74/44;
 74/331; 74/413; 74/603; 123/192.1; 123/192.2
[58] Field of Search ................... 74/591, 44, 331, 413,
 74/443, 603, 604; 123/192.1, 192.2

[56] References Cited

U.S. PATENT DOCUMENTS

| 3,203,274 | 8/1965 | Barth et al. | 123/192.1 X |
| 3,995,610 | 12/1976 | Nakamura et al. | 123/192 B |
| 4,509,378 | 4/1985 | Brown | 74/591 X |
| 4,572,025 | 2/1986 | Mitchell | 123/192.2 X |
| 5,038,731 | 8/1991 | Shimada | 123/192.2 |
| 5,044,333 | 9/1991 | Fuchigami et al. | 123/192.2 |
| 5,065,644 | 11/1991 | Shimada | 123/192.2 X |

FOREIGN PATENT DOCUMENTS

| 3840307 | 6/1989 | Fed. Rep. of Germany | 123/192.1 |
| 2633995 | 1/1990 | France | 74/591 |
| 56-7536 | 2/1981 | Japan . | |
| 60-155033 | 8/1985 | Japan . | |
| 3-70823 | 3/1991 | Japan | 123/192.2 |

Primary Examiner—Leslie A. Braun
Assistant Examiner—William O. Trousdell
Attorney, Agent, or Firm—Lyon & Lyon

[57] ABSTRACT

This invention is concerned with an improved system of dynamic balancing of the primary and secondary vibrations associated with combustion and inertial momentum effects, in particular, in single cylinder engines. By means of the primary and secondary balancing shafts, the invention achieves maximum balancing effects in small spaces, by combining the power transmission and dynamic balancing functions of the shafts; by mechanical arrangement of the primary and secondary balancing shafts in the vicinity of and parallel with the crank shaft; and by a judicious choice of the inter-shaft distances to permit placing the largest possible momentum balancing weights to the balancing sections.

7 Claims, 5 Drawing Sheets

ENGINE BALANCING AND IMPROVEMENTS THEREOF

THE FIELD OF THE INVENTION

The present invention relates to the structural features of motive engines, in particular single cylinder engines, which provide a quiet and comfortable ride.

BACKGROUND OF THE INVENTION

Examples of balancer constructions to reduce vibrations caused by motive engines are disclosed, for example, in JPA First Publication 1985-155033 and JPA Second Publication 1981-7536.

The balancer disclosed in the former patent application is constructed in such a way that a pair of balance weights is fixed to each of the balancer shafts arranged in parallel with the crank shaft. The secondary vibration by the engine is controlled by counter rotating counter weights of each of the balancers at a speed twice the rotational speed of the crank shaft.

In the case of single cylinder engines, the primary vibrational effects are quite serious, and it becomes necessary to control not only the secondary but the primary vibration caused by the engine.

If the primary vibration balancer is to be installed for a single cylinder engine according to this technique, it becomes necessary to provide a pair of primary balancer shafts separately from the secondary vibration balancer, and to rotate the secondary balancer shafts at the same rotational speed as the crank shaft and in the same direction. This type of design can lead to many problems, such as the necessity of providing extra space for the secondary balancer; complexity of the mechanisms for transmission of the rotational forces; thus leading to overall loss of freedom in design flexibility.

According to the disclosure in the second patent application, a pair of balancer shafts are located in parallel with the engine crank shaft, and fixing each of the balancer shafts with balancing weights; and disposing each of the balancer shafts within a given region of the coordinates of the crank shaft.

In this condition, the balance weights of the pair of balancer shafts are rotated at twice the rotational speed of the crank shaft, and in the counter direction to each other, to control the secondary vibration of the engine. By locating the balance weights within a certain region of the crank shaft, the vibrational moments created by the head and cylinder sections of the engine are controlled at the same time.

This technique has the following disadvantages.

Because the balancer shaft must be located in a designated region with respect to the crank shaft, the design freedom in engine layout becomes lost.

Furthermore, if the engine capacity should need changing, it becomes necessary to relocate the balancer shafts because the vibrational moments of the head and cylinder sections are also altered by changes in the engine capacity. Thus, the desirable generic nature of the engine becomes lost.

Additionally, the following general problems of the conventional engine balancing technology can be listed. In single cylinder engines, it is desirable to make the inertial momentum sufficiently high so a to produce low vibrations and a smooth running operation.

In general, in order to increase the inertial momentum of the crank shaft, it is desirable to:

1. Increase the outer diameter of a pair of balance weight sections attached to the crank shaft;
2. Increase the thickness of the pair of balance weights in the axial direction of the crank shaft;
3. Enlarge the size of the flywheel attached to the crank shaft.

However, if the approach 1 is adopted, it is necessary to increase the inter-axial dimensions between the crank shaft and the main shaft of the transmission to avoid mechanical interference of the crank shaft and the balance weight sections, thus leading to the undesirable result of increasing the size and weight of the engine. Also, an increase in the inertial momentum of the crank shaft can be achieved effectively by distributing the balancing mass away from the axial center of the crank shaft. However, by adopting the approach 2, because the outer diameter of the balance weight section is kept small, the increase in the inertial momentum is relatively low in comparison to the necessary weight increase of the crank shaft. The adoption of the approach 3 tends to lead to problems of vibrations caused by twisting or bending forces on the crank shaft, and stiffening of the shaft by increasing its size leads to the undesirable end result of an increasing weight of the crank shaft.

SUMMARY OF THE INVENTION

The purpose of the present invention is to present effective solutions for the production of quiet running cost efficient single cylinder engines, and the first preferred embodiment is concerned with a balancing device described below.

Dynamic vibrations in a motive vehicle having an engine, a crank shaft, and a transmission, are controlled by a balancing mechanism comprising:

(a) a pair of primary balance weights rotating at the same rotational speed as the crank shaft; and a pair of secondary balance weights rotating a twice the rotational speed of the crank shaft;

(b) a primary balancer shaft and a secondary balancer shaft disposed in the vicinity of and in parallel with the crank shaft; said primary and secondary balancer shafts being rotated by means of respective gears disposed on the crank shaft; wherein on the primary balancer shaft are disposed two balance weights, consisting of one from each of the pairs of the primary and secondary balancing weights, and the remaining one balance weight of said pair of primary balance weights is disposed on the secondary balancer shaft; and (c) a tertiary balancer shaft disposed in the vicinity of and in parallel with the secondary balancer shaft; said tertiary balancer shaft being rotated by means of gears disposed on the secondary balancer shaft; wherein on said tertiary balancer shaft is disposed the remaining balance weight from the pair of the secondary balance weights;

wherein the positional relationship of the components of the mechanism is further defined in a numerical relationship:

$$L1:L2:L3 = 1.5:1.5:1$$

where the symbols L1, L2 and L3 denote the distances between the components as defined below:

L1 is the inter-axial distance between the primary balancer shaft and the crank shaft;

L2 is the inter-axial distance between the crank shaft and the secondary balancer shaft; and L3 is the inter-axial distance between the secondary balancer shaft and the tertiary balancer shaft.

According to this invention, by choosing the interaxial distances between the crank shaft and each of the balancer shafts as stated above, it becomes possible:

to minimize the space required by placing one of the primary balance weights and one of the secondary balance weights, each of which have different rotational speeds, on the same axis to share at least one shaft between the primary and the secondary balance weight sections thereby leading to saving in space requirement, and also to prevent the engine structure from becoming overly complex by arranging the power transfer system of the primary and the secondary balancer, respectively, in one plane to minimize the dimension of power transmission path from the crank shaft to the balancer shafts.

The second invention concerns a driving mechanism for a motive vehicle having an engine, a crank shaft and a transmission; said mechanism comprising:

(a) a secondary balancer shaft disposed in the vicinity of and in parallel with the crank shaft, said balancer shaft having a follower gear;

(b) a primary gear disposed on and rotated by the crank shaft rotated by engaging with the follower gear so as to transmit the rotational power to the secondary balancer shaft;

(c) a secondary balance weight disposed on the secondary balancer shaft, said secondary balance weight rotating and controlling the vibration of the engine wherein the follower gear of the secondary balancer shaft is constructed such that the mass of the follower gear is distributed locally in a radial direction so as to constitute a momentum balancer to control the engine vibration.

According to this aspect of the invention, the vibration of the engine is controlled even more effectively by locating one of the pair of momentum balancers on the same axis as that of the balance weight so as to nullify the secondary component which reaches its peak by the action of the vibrational moment created during the combustion process.

The third invention concerns a driving mechanism for a motive vehicle having an engine, a crank shaft and a transmission, said mechanism comprising:

(a) a balancer shaft disposed in the vicinity of and in parallel with the crank shaft, said balancer shaft being provided with a follower gear (b) a pair of balance weight sections disposed on the crank shaft said sections rotating to control the engine vibrations produced by the engine rotation;

(c) a main shaft and a counter shaft disposed in the vicinity of and in parallel with the crank shaft, said main shaft being geared to the crank shaft;

(d) a transmission disposed between the main shaft and the counter shaft, said transmission being connected operatively with the main shaft and the counter shaft through a plurality of gears provided on both shafts having a range of gear diameters;

wherein one of said pair of balance weight sections having a larger radius than the other balance weight section is disposed opposite to the main shaft gear having the smallest radius.

According to this aspect of the invetion, by placing one weight section of a pair of balance weight sections on the crank shaft opposite to the smallest diameter gear on the main shaft of the transmission disposed parallel to the crank shaft, it becomes possible to increase the outer diameter of the balance weight section to the maximum extent possible so as not to interfere with the smallest diameter gear. Such a design allows an increase in the mass distribution away from the center of the crank shaft, thereby permitting an effective increase in the inertial momentum of the crank shaft.

PREFERRED EMBODIMENT OF THE INVENTION

Figure 1:
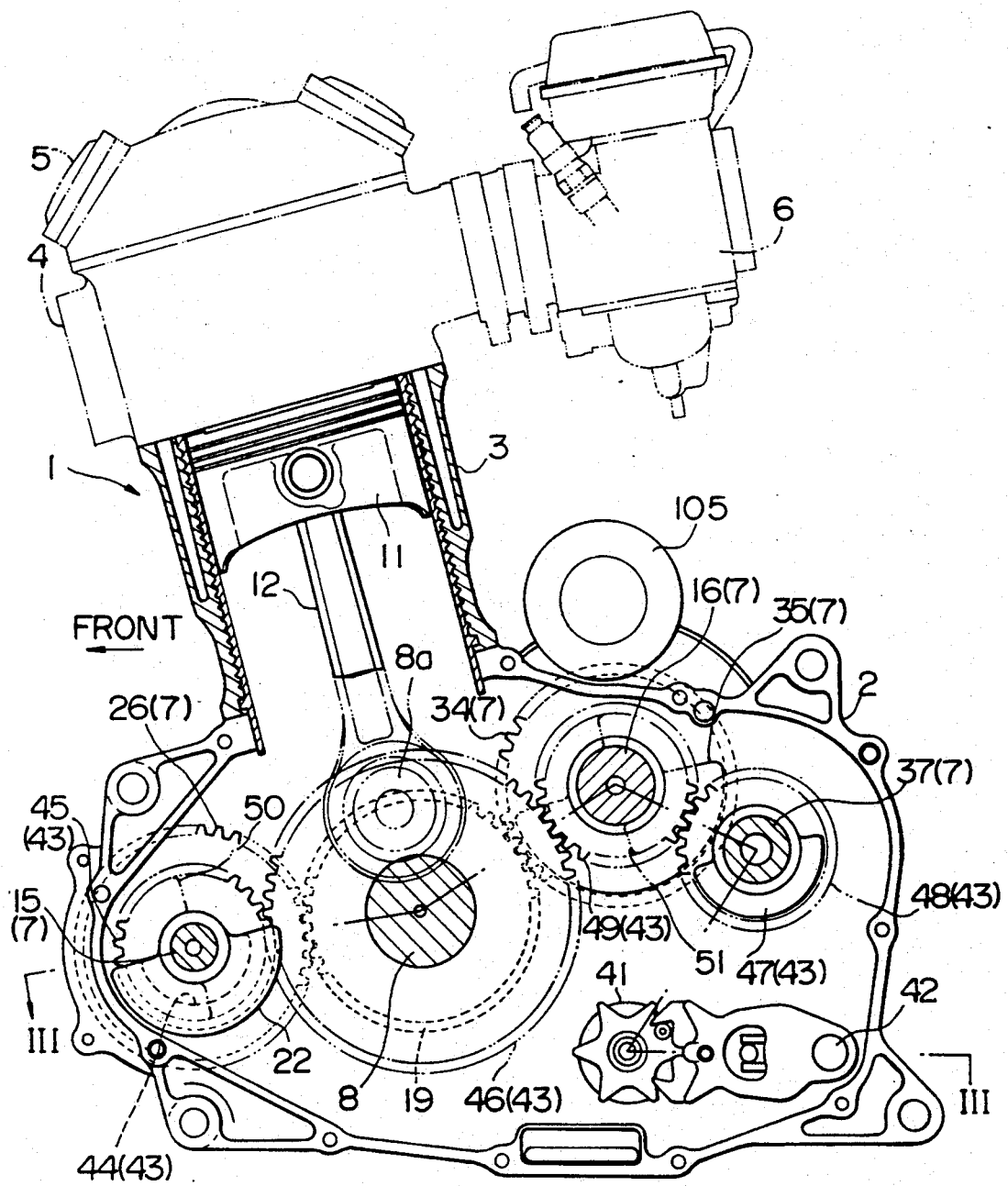
FIG. 1 is a left side cross sectional view of an engine in a first preferred embodiment.

Preferred embodiment is explained with reference to FIGS. 1 to 5.

Numeral 1 refers to an engine (in the figures, a single cylinder, four-cycle engine) and is equipped with a crank case 2, and a cylinder block 3, a cylinder head 4 disposed on the top region of the cylinder block 3, a head cover 5 disposed on the top region of the cylinder head 4 and a carburetor 6 fixed to the cylinder head 4 and connected operatively in the air passage way disposed within the head.

Figure 3:
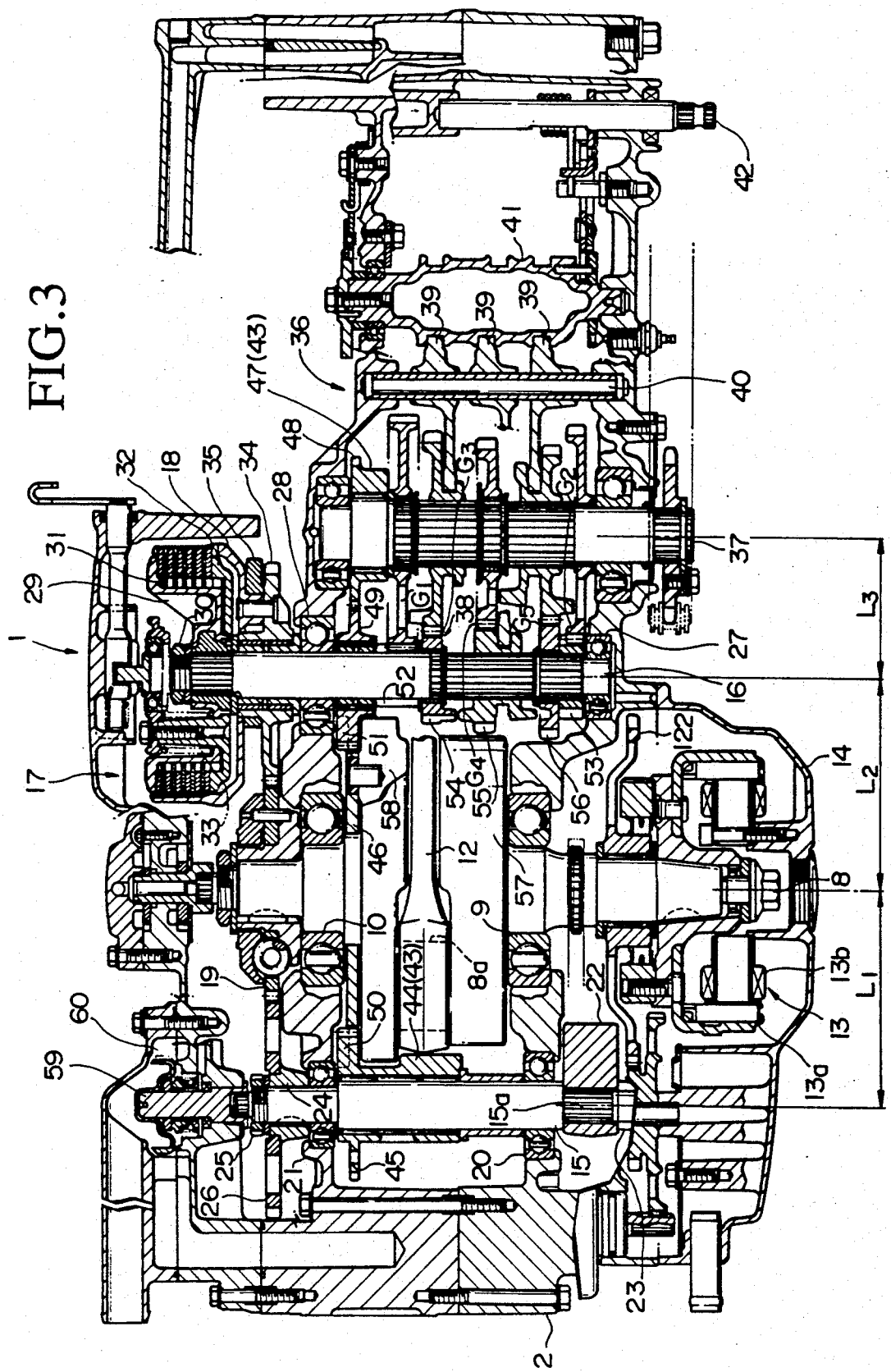
FIG. 3 is a cross sectional view at a plane defined by III—III of FIG. 1.

A balancer device 7 is provided on the inside the crank case. In about the mid-portion of the crank case 2, as shown in FIG. 3, is a freely rotatable crank shaft 8 installed in the crank case 2 through a pair of bearings 9, 10. The crank shaft 8 has a crank pin 8a to which is connected a freely slidable piston 11 through a connecting rod 12.

At the end of the crank shaft 8 protruding out of the crank case 2 through the bearing 9 is disposed a rotor 13a of a generator 13, inside of which is disposed a stator 13b and, together with the generator cover 14 to be attached to a side surface of the crank case 2, constitute the generator 13.

With reference to FIGS. 1 and 3, at the opposite end of the crank shaft 8 protruding out of the crank case 2 through the other bearing 10, there is disposed a primary gear 19 which rotates the first balancer shaft and the outer clutch 18 of the clutch 17 which is provided on the main shaft 16.

The balancer shaft 15 is disposed parallel to the crank shaft 8, and as shown in FIG. 3, it is freely rotatably supported by a pair of bearings 20, 21 located inside the crank case 2, and both ends of the crank shaft are protruding out of the crank case 2.

On one end of the balancer shaft 15, there is formed a spline 15a along the axial direction of the shaft 15. This spline 15a prevents a relative rotation of one of the pair of primary balance weight 22 which is fixed to the primary balancer shaft 15 by means of a nut 23 threaded onto one end of the primary balancer shaft 15. Therefore, this end of the primary balance weight 22 is located on the outside of the crank case 2 through the bearing 20.

The opposing end of the primary balancer shaft 15 protruding out of the crank case 2 to which a collar 24 is fixed firmly by means of a nut 25, and on the collar 24 is firmly fixed a driven gear 26 whose teeth are engaged with the primary gear 19 disposed on the crank shaft 8.

By this arrangement, the rotation of the crank shaft 8 is transmitted to the primary balancer shaft 15 through the primary gear to the driven gear 26, thereby rotating the primary balance weight 22 at the same rotational speed as the crank shaft 8.

The main shaft 16, as shown in FIG. 1, is disposed oppositely to the primary balancer shaft 15 and parallel with the crank shaft 8. The main shaft 16 is freely rotatably supported, by means of a pair of bearings 27, 28 installed in the crank case 2, and its one end is disposed inside the crank case 2 while the opposite end protrudes out of the crank case 2 through the bearing 28, as shown in FIG. 3.

The protruding end of the main shaft 16 is firmly attached with a nut 30 to the inner clutch 29 of the clutch 17 by means of a spline to prevent a relative rotation of the clutch 29.

The outer clutch 18 almost surrounds the inner clutch 29, and is freely and rotatably supported at the outer periphery of the protruding end of the main shaft 16.

Between the inner clutch 29 and the outer clutch 18 are disposed several circular clutch plates 31 along the axial direction of the main shaft 16, which clutch plates are able to be engaged alternately with the inner and outer clutches 29 and 18, respectively, around the axis thereof.

Between the outer clutch 18 and inner clutch 29 along the main shaft 16 are disposed a pressure plate 32 freely slidable in the shaft axial direction, and thereby to press the clutch plates 31 against the inner clutch 29 by means of the tension forces provided by the clutch springs 33.

As shown in FIG. 3, on the side of the crank case 2 for the outer clutch 18, the driven gear 34 is attached, engaging with the primary gear 19 and supported freely rotatably relative to the main shaft 16. The driven gear 34, the outer clutch 18 and the other primary balance weight 35 squeezed between the two are connected so as to rotate as a unit around the main shaft 16.

Therefore, this primary balance weight 35 is disposed on the outside of the crank case 2 and opposite to the balance weight 22, and also is rotated, by the crank shaft 8, in the opposite direction to the rotation direction of the crank shaft 8.

The relative positions of the crank shaft 8, the primary balancer shaft 15 and the main shaft 16 are arranged so that the inter-axial distance L1 between the crank shaft 8 and the primary balancer shaft 15 is equal to the axial center distance L2 between the crank shaft 8 and the main shaft 16.

The number of teeth on the primary gear 19 and both of the driven gear 26, 34 are set equal, thereby permitting the balance weights 22-35 to rotate at the same rotational speed as the crank shaft 8 but in opposite directions thereto.

In the meanwhile, the engine 1 is co-equipped with a transmission 36 which includes the main shaft 16 as a structural element.

The transmission 36 is disposed inside the crank case 2, and is provided with: a counter shaft 37 which is aligned parallel with the main shaft 16 and acts as a third balancer shaft; a set of speed change gears 38 disposed between the main shaft 16 and the counter shaft 37; a plurality of shift forks 39 which selectively operates the speed change gear sets 38; a guide shaft 40 which guides the movement of the shift forks 39; a shift drum 41 which is connected to each of the shift forks 39 and provides their shifting; and a shift shaft 42 which drives and rotates the shift drum 41.

Further, a secondary balancer 43 is provided on the peripheral surface of the balancer shaft 15, disposed in a space between the interior side of the crank case 2 and the counter shaft 37 in the crank case 2.

The secondary balancer 43 comprises the following components: one of a pair of secondary balance weights 44 connected freely rotatably relative to the peripheral surface of the primary balancer shaft 15; a driven gear attached integrally to the secondary balance weight 44; a drive gear attached non-rotatably relative to the crank shaft 8; the other secondary balance weight 47 of the pair of balance weights attached freely rotatably relative to the peripheral surface of one end of the counter shaft 37 disposed inside the crank case 2; a driven gear 48 made integral with the secondary balance weight 47; and an idle gear 49 which meshes with both the drive gear 46, which is attached to the crank shaft 8, and the driven gear 48, which is attached to the secondary balance weight 47 disposed on the counter shaft 37.

The distance L3 between the axes of the main shaft 16 and the counter shaft 37 and the distance L1 between the crank shaft 8 and the primary balancer shaft 15 is given by a mathematical relationship $L1 = 1.5 \times L3$. The number of teeth on the driven gear 45, 48 is the same as that on the idle gear 49 while the drive gear 46 has twice the number of teeth of the driven gear 45, 48 and the idle gear 49.

Therefore, as the crank shaft 8 rotates, each of the balance weights 44, 47 rotates at twice the rotational speed of the crank case 8, and at the same time the balance weight 47 rotates in the same direction a the crank shaft 8 while the balance weight 44 rotates counter to the crank case 8.

The diameter of the region of the counter shaft 37 which receives the secondary balance weight 47 is made larger than the diameter of the spline region where the speed change gear set 38 is attached.

The reason for the diameter difference is to strengthen only that region of the counter shaft 37 which is subject to bending moment caused by the centrifugal force exerted by the rotating secondary balance weight 47, thereby to enable a reduction in the effective diameter of the counter shaft 37.

Further, on the driven gear 45 attached to the primary balancer shaft 15 is provided one momentum balancer 50 of a pair of momentum balancers 50-51 in a unit, as shown in FIGS. 1 and 3. Therefore, this momentum balancer 50 is disposed on the same axis as one of the secondary balance weight 44.

On the idle gear 49 attached freely rotatably to the main shaft 16 is disposed, as shown in FIGS. 1 and 3, the other momentum balancer 51 of the pair of momentum balancers 50-51, so as to rotate with the idle gear 49 as a unit.

There are five speed changing gear trains G1-G5 in a speed changing gear set 38 composed of gears 52 to 56, disposed on the main shaft 16, of which gears 52 of the first speed changing gear train G1 has the smallest diameter and the largest speed reduction ratio. In this case, of the pair of left and right balance weight sections 57, 58, the right balance weight section 58 is disposed opposite to the smallest diameter gear 52 of the first speed changing gear train G1, with a slight amount of spacing. The left balance weight section 57 is disposed opposite to the peripheral region of the larger diameter gears 54, 55 of the gear trains G3 and G4, with a slight amount of spacing. Thus, the outer diameter of the right balance weight section 58 is larger than that of the left balance weight section 57, and therefore, the right balance weight section 58 is thinner than the left balance weight section 57. By increasing the outer diameter and reducing the thickness of the balance weight section 58, it becomes possible to increase the inertial momentum, which varies proportional to the second power of the radius, even when the weights of the two balancing weights sections 57, 58 are the same.

The right end of the primary balance shaft 15 is joined with a water pump shaft 59 which comprise a part of a water pump 60 for the circulating water.

On the upper section of the block 5, a cylinder head 9 which forms an internal combustion chamber 100, an intake port 101, an exit port 102 to which are attached intake and exit valves 103 and 104, respectively. At the rear upper region of the crank case 2 is attached a starter motor 105. The right side of the crank case 2 is enclosed with a detachable crank case cover 112, a part of which is further covered with a small side cover 113.

As described earlier, the crank shaft 8, supported by a pair of bearings 9, 10 disposed on the inside of crank case 2, is provided with a pair of balance weight sections 57, 58 at its mid-portion. The pair of balance weight sections 57, 58 is connected with a crank pin 8a to which is connected the large end portion of the connecting rod 12, through needle bearings 120. To the left end of the crank shaft 8 is attached the generator 13, which also serves as a flywheel, and to the inside axis is firmly attached a ring gear 122 which is driven by the starter motor 105 for starting the engine 1. Also, the primary gear 19 is rigidly attached to the right side of the crank shaft 8 to transmit power to the transmission through the clutch 17. The driving axle of the pump 24, joined with the right region of the crank shaft 8, is supported freely rotatably at the crank case cover 112 which covers the opening of the crank case 2. The pump driving axle 124 supports a trochoid type scavenger pump 125 and a feed pump 126.

Figure 4:
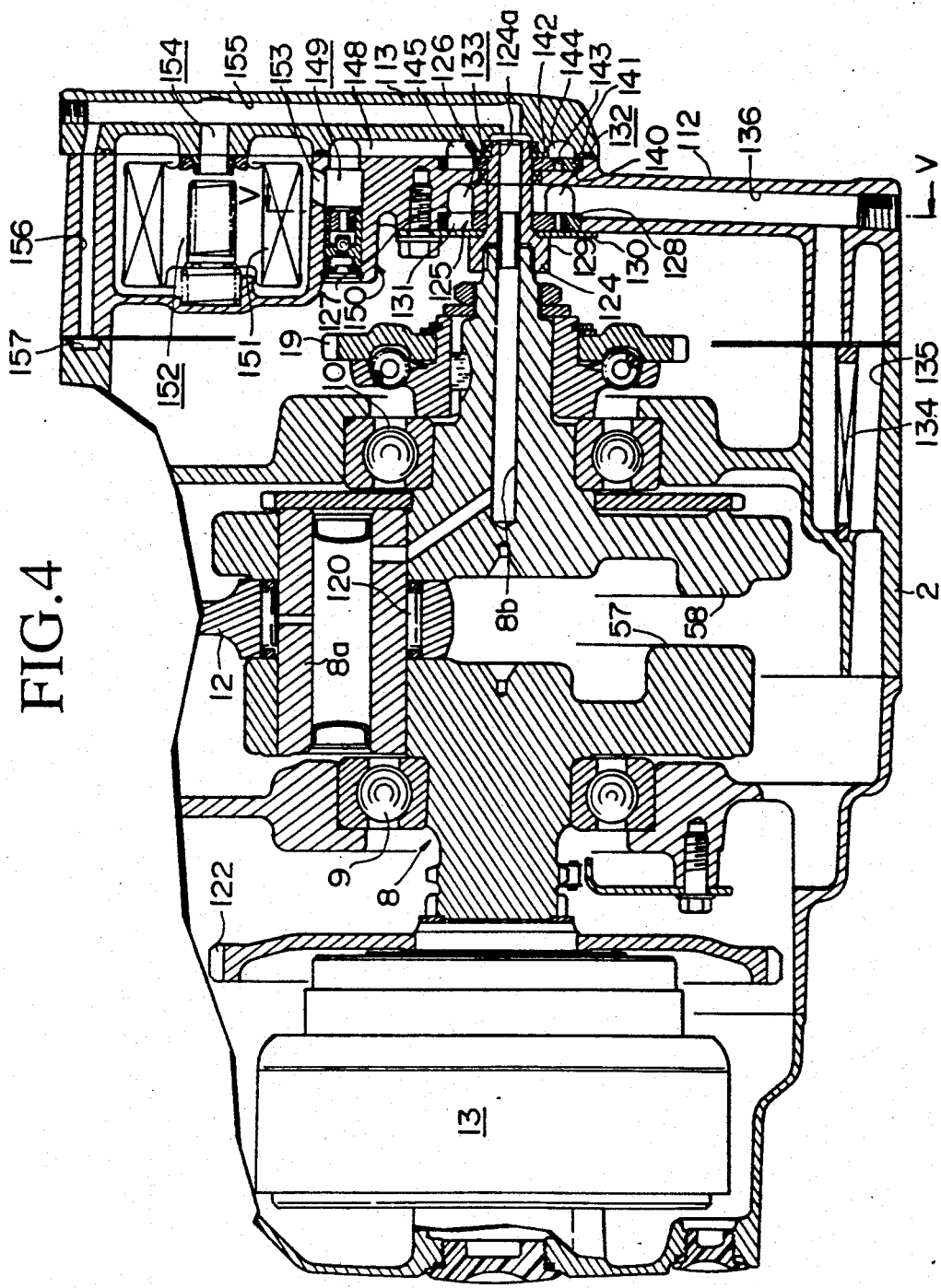
FIG. 4 a cross sectional view at a plane defined by IV—IV of FIG. 1.
Figure 5:
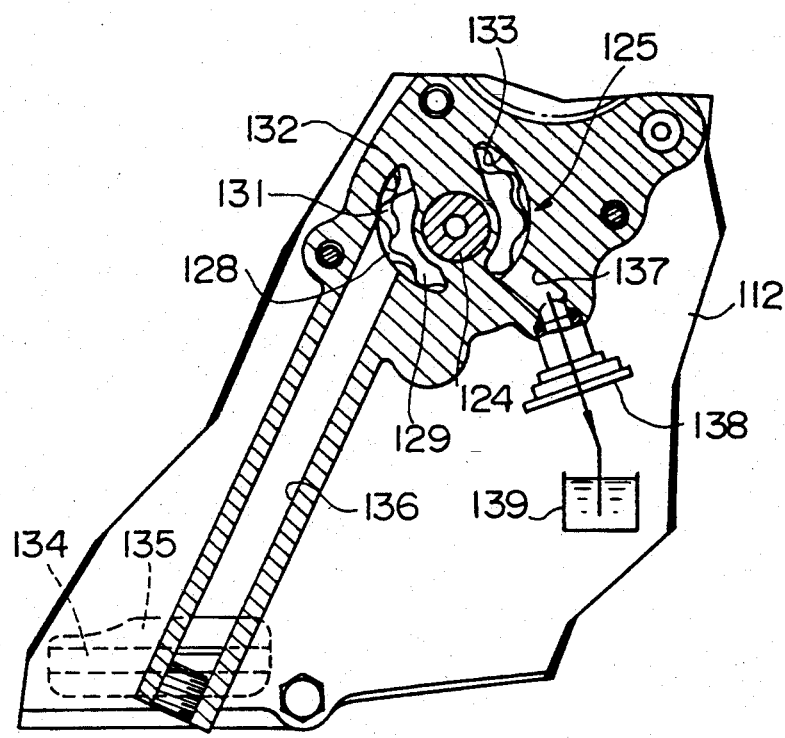
FIG. 5 is a cross sectional view at a plane defined by V—V of FIG. 1.

The structural features of the scavenger pump 125 will be explained with reference to FIGS. 4 and 5. On the inside surface of the crank case cover 112, a circular depression 127 is formed, eccentrically with respect to the driving axle 124, as part of the pump housing. The circular depression 127 supports freely rotatably an outer rotor 128 having internal teeth, which mesh with the teeth of an inner rotor 129, having external teeth, which is fixed to the pump driving axle 124. The side surface of the two rotors close to the crank shaft 8 is covered with a side plate 130. Between the inner 129 and the outer 128 rotors are present several operating chambers 131 which can vary their volume with the rotation of the driving axle 124. On the inside of the crank case cover 112, there is an intake port 132 which opposes the volume expansion side of the chamber and an exit port 133 which opposes the volume contraction side of the chamber. At the bottom of the crank case 2, there is an oil reservoir 135 having a strainer 134, and this oil reservoir 135 communicates with the intake port 132 through an oil passage 136 provided on the inside of the crank case cover 112. The exit port 133 is connected with an oil tank 139 through an oil passage 137 and a connector 138 provided on the inside of the crank case cover 112.

Figure 2:
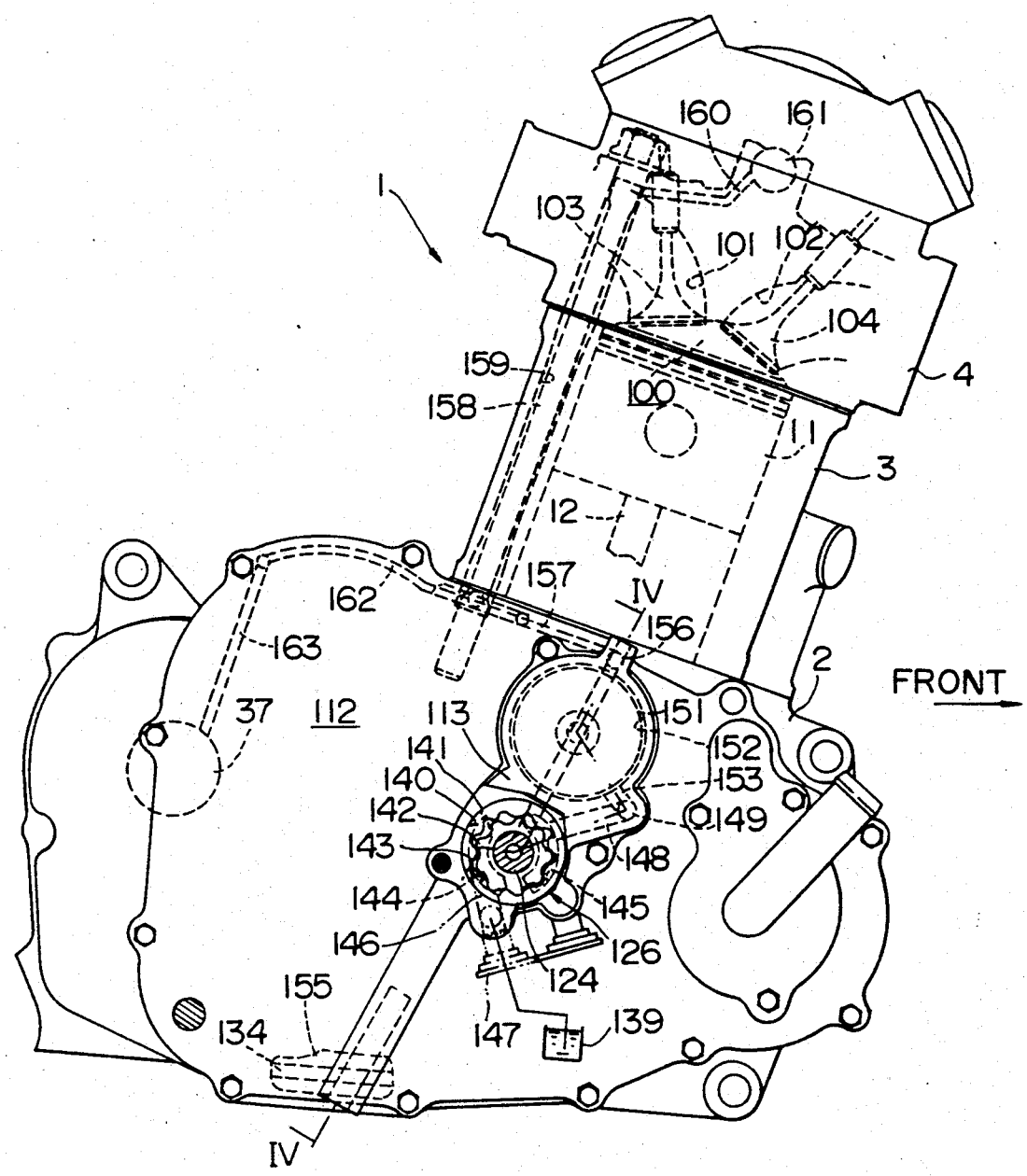
FIG. 2 is a right side view of the engine shown in FIG. 1.

The structural features of the feed pump 126 will be explained with reference to FIGS. 2 and 4. The feed pump 126 is constructed basically the same as the scavenger pump 125. On the outside surface of the crank case cover 112 is a depression 140 as part of the pump housing. The depression 140 supports freely rotatably an outer rotor 141 and an inner rotor 142 which is fixed to the pump driving axle 124 and meshes with the outer rotor 141. The outer surface of the outer rotor 141 and the inner rotor 142 is covered with a side plate/cover 113, and on the inside of the side cover 113, there is an intake port 144 and an exit port 145 which oppose the operating chamber 145 of the feed pump 126. The intake port 144 connects with the oil tank 139 through an oil passage 146 and a connector 147 provided on the side cover 113. The exit port 145 connects to the relief value storage chamber 149 provided on the crank case cover 112 through an oil passage 148 provided on the inside of the side cover 113.

The relief valve 150 disposed on the storage chamber 149 prevents leaking of oil from the oil tank 139 during the time the engine 1 is stopped. In the interior of the crank case cover 112, there is a filter chamber 152 having an internal filter 151 and a side cover 113 which closes the filter insertion opening. The filter chamber 152 and the relief valve storage chamber 149 are interconnected thorough an opening 153.

The center region of the filter chamber 152 is connected through the opening 154 with an oil passage 155 provided on the inside of the side cover 113. The lower end of the oil passage 155 is connected to the outer periphery of the crank pin 8a through an oil passage 124a, which passes through the center of the pump driving shaft 8, and an oil passage which passes through the interior of the crank shaft 8. The upper end of the oil passage 155 is connected to the outer periphery of the cam shaft 161 through an oil passages 156, 157 provided on the interior of crank case 2 and an oil passage 159 which is formed on the periphery of bolts 158, which attach the cylinder bloc 3 and the cylinder hear 4 to the crank case 2, and through an oil passage 160 which is formed in the interior of the cylinder head 4. The oil passage 157 formed on the crank case 2 connects to the periphery of the counter shaft 37 of the transmission 36 through the oil passages 162, 163.

The balancer device 7 described earlier in this embodiment, operates in the following manner. As the crank shaft 8 rotates, the primary gear 19 drives a pair of primary balance weights 22-35 at the same rotational speed but in the opposite direction to the primary gear 19. A pair of secondary balance weights 44-47 is driven by a drive gear 46 and an idle gear 49 to rotate both balance weights at twice the speed of the crank shaft 8, while rotating one balance weight 44 of the pair in the opposite direction as the crank shaft 8 but the other balance weight 47 in the same direction to the crank shaft 8. Additionally, a pair of momentum balancer weights 50-51 is driven by a drive gear 46 at twice the speed of the crank shaft 8 and in the opposite direction.

The result of the above control system is a quieter running engine effected by the control of the primary vibration of the engine 1 by means of the pair of balance weights 22-35 and the control of the secondary vibration of the engine 1 by means of the pair of balance weights 44-47.

The above components for the vibration control are disposed in a compact space in a densely packed mechanical components of the engine 1 by setting the following geometrical restrictions with respect to the distances L1, L2 and L3, respectively between the crank shaft 8 and the primary balancer shaft 15, between the crank shaft 8 and the main shaft 16 and between the main shaft 16 and the counter shaft 37, as:

$$L1:L2:L3 = 1.5:1.5:1$$

in order to achieve: keeping the force transmission path at its minimum; keeping all the driving components in a plane; and keeping the dimension of the device compact, while satisfying the operating requirements of the two pairs of the primary balance weights 22·35 and the secondary balance weights 44·47 in relation to the predetermined operating condition of the crank shaft 8.

In this case, as seen from FIG. 1, by placing the position of the primary balancer shaft 15 (disposed on the front section of the crank case 2) higher than the main shaft 16 of the transmission 36 (disposed on the rear section of the crank case 2) and by placing the counter shaft 37 of the transmission 36 higher than the main shaft 16, it has become possible to raise the position of the bottom region of the crank case 2 in the present invention compared with the traditional case. Therefore, the use of this type of single cylinder engine in two wheeled vehicles resulted not only in an easier riding vehicle over obstacles by lowering of the center of gravity by permitting the engine 1 to be placed lower in the vehicle.

When the crank shaft 8 is rotated, the flywheel effect is created by the inertial effect of the balance weight sections 57, 58, and in this case, the right balance weight section 58 opposite the smallest diameter gear 52 provided o the main shaft 16 of the transmission 36 is also rotated and it becomes possible to increase the inertial momentum in the radial direction of the crank shaft 8 in the present invention because of the increased mass of the right side balance weight section 58.

Further, the action of the momentum balancer 50·51 controls the vibrational moment produced by the inertial effect of the combustion and reciprocating sections o the engine 1. In this embodiment, the vibration of the engine 1 is controlled even more effectively by locating one of the pair of momentum balancers 50·51 on the same axis as that of the balance weight 44 so as to nullify the secondary component which reaches its peak by the action of the vibrational moment created during the combustion process.

Furthermore, because the momentum balancers 50·51 is provided separately from the secondary balancer 43, it becomes unnecessary to set the relative positions of the momentum balancers 50·51 within a certain radian angle of the crank shaft 8, thus permitting increased design freedom for the engine 1.

Further, the main shaft 16 serving as the secondary balancer shaft also serves as the primary balancer shaft 15; the secondary balancer shaft and the tertiary balancer shaft are common, respectively, with the main shaft 16 and the counter shaft 37 of the transmission 36; and furthermore, the momentum balancers 50·51 are disposed on the same shaft as the balancer shaft 15 and the main shaft 16, respectively. By adopting such design features, additional shafts need not be installed even when momentum balancers 50·51 are provided in addition to the primary and secondary balancers, thus leading to effective simplification of the engine 1 design.

Further, by adopting the system of inter-axial distances as described earlier, the three gears used for the secondary balancer power transmission, that is, the design conditions for driven gear 45, idle gear 49 and driven gear 48 can all be systematized, thereby leading to improvements in productivity.

Further in the present invention, because the pair of primary balance weights 22·35 is disposed on the outside of the crank case 2, it becomes easier to decide its placement position in the crank case, and it becomes possible to select point symmetry placement with respect to the center of the crank case 2, thereby leading to cancellation of a coupling force produced by the primary balance weight 22 with a countering force of the other primary balance weight 35.

The invented design is thus able to control the primary vibration of the engine 1.

Next, the operation of the oil pump will be described.

When the crank shaft 8 is rotated by the engine 1, the driving shaft 124 fixed to one end of the crank shaft 8 is rotated, and both scavenger pump 125 and the feed pump 126 are operated at the same time.

The rotation of the outer rotor 128 and the inner rotor 129 of the scavenger pump 124 causes the oil in the oil reservoir 135 is drawn into and filtered through the strainer 134. The oil then passes through the oil passage 136, disposed in the crank case cover 121, and through the intake port 132 into the operating chamber 131 of the scavenger pump 125, from which it is expelled through the exit port 133 and, after passing through the oil passage 137 and the connector 138, returns to the external oil tank 139.

In the meantime, the oil drawn from the external oil tank 139, by the action of the outer rotor 141 and inner rotor 142 of the feed pump 126, passes through the connector 147, oil passage 146, and enters the operation chamber 143 through the intake port 144, from which the oil is expelled into the oil passage 148 disposed in the side cover 113 through the exit port 145. The oil enters the storage chamber 149 of the relief valve 150, where its pressure is adjusted, and enters the filtering chamber 152 of a cylindrical filter 151 through its opening 153 and is filtered by passing through the filter from the outside to the inside. The filtered oil then passes through an opening 154 provided on the side cover 113 into the oil passage 155, and a part of which is supplied to the periphery of the crank pin 8a after passing through the passage 124 provided on the inside of the driving pump axle 124 and through the oil passage 8b provided on the inside of the crank shaft 8. The remaining oil inside the oil passage 155 in the side cover 113 goes through the oil passages 156, 157, 162 and 163 in the crank case 2 to lubricate the counter shaft 37 of the transmission 36. Meanwhile, part of the oil from the oil passage 157 diverts upward to lubricate the camshaft 161 after passing through the oil passage 159 around the periphery of the bolt 158 and the oil passage 160 in the cylinder head 4. The oil which has lubricated the various parts of the engine 1 collects at the bottom of the crank case 2, and is returned to the oil tank 139 by the scavenger pump 125.

The filter can be changed readily by accessing it through the filter insertion opening 151 after removing the side cover 13 provided on the crank case cover 112. The strainer 134 provided on the oil reservoir 135 of the crank case 2 can be changed by removing the crank case cover 112 from the crank case 2.

It should be noted that dimension and configurations shown in the preferred embodiment described above are but examples, and variations are possible depending on the type of engine and other design requirements.

For example, the left side balance weight section 57 is made thicker than the right side balance weight section 58, but the thickness of the two weights can be the same.

Further, the scavenger pump 125 is disposed on the inside surface of the crank case cover 112, and the feed pump 126 on the outside of the same, however, the placement of the two pumps 125 and 126 can be reversed. These pumps 125 and 126 are trochoidal in the examples presented, but other pump types, such as internal contact gear pumps having sectional spaces between the internal and external teeth or external gear pumps made by combining two external toothed gears, are applicable.

What is claimed is:

1. A driving mechanism for a motive vehicle having an engine, a crank shaft, and a transmission, said mechanism comprising:
   (a) a pair of primary balance weights rotating at the same rotational speed as the crank shaft; and a pair of secondary balance weights rotating at twice the rotational speed of the crank shaft;
   (b) a primary balancer shaft and a secondary balancer shaft disposed in the vicinity of and in parallel with the crank shaft; said primary and secondary balancer shafts being rotated by means of respective gears coupled with the crank shaft; wherein on the primary balancer shafts are disposed two balance weights, consisting of one from each of the pairs of the primary and secondary balance weights, said primary balance weight on the primary balancer shaft being rotated with the primary balancer shaft, said secondary balance weight on said primary balancer shaft and being rotatably mounted about said primary balancer shaft and being rotated by a secondary balance weight driving gear disposed on said crank shaft and rotating therewith, and the remaining one balance weight of said pair of primary balance weights is disposed on the secondary balancer shaft; and
   (c) a tertiary balancer shaft disposed in the vicinity of and in parallel with the secondary balancer shaft; said tertiary balancer shaft being rotated by said secondary balance weight driving gear and an idle gear, the idle gear being disposed on the secondary balancer shaft; wherein on said tertiary balancer shaft is disposed the remaining balance weight from the pair of the secondary balance weights;
   wherein the positional relationship of the components of the mechanism is further defined in a numerical relationship:

$$L1:L2:L3 = 1.5:1.5:1$$

where the symbols L1, L2 and L3 denote the distances between the components as defined below:
   L1 is the inter-axial distance between the primary balancer shaft and the crank shaft;
   L2 is the inter-axial distance between the crank shaft and the secondary balancer shaft; and
   L3 is the inter-axial distance between the secondary balancer shaft and the tertiary balancer shaft.

2. The driving mechanism as claimed in claim 1, wherein said secondary balancer shaft is a main shaft of the transmission.

3. The driving mechanism as claimed in claim 1, wherein said tertiary balancer shaft is a counter shaft of the transmission.

4. A driving mechanism for a motive vehicle having an engine, a crank shaft and a transmission; said mechanism comprising:
   (a) a balancer shaft disposed in the vicinity of and in parallel with the crank shaft, said balancer shaft having a first driven gear formed in one body with the balancer shaft and a second driven gear rotatable around the balancer shaft;
   (b) a primary gear and a drive gear disposed on the crank shaft, said primary gear being engaged to the first driven gear so as to transmit the rotational power to the balancer shaft, and said drive gear being engaged to the second driven gear;
   (c) a primary balance weight disposed on the balancer shaft, said primary balance weight rotating and controlling the vibration of the engine;
   (d) a secondary balance weight formed in one body with the second driven gear, said secondary balance weight rotating and controlling the vibration of the engine,
   (e) said primary and secondary balance weights rotating and nullifying the primary and secondary component of the vibrational moment created during the combustion process,
   wherein the second driven gear is constructed such that the mass of the second driven gear is distributed locally in a circumferential direction so as to constitute a momentum balancer which is out of phase with the secondary balance weight.

5. The driving mechanism as claimed in claim 4, wherein the thickness of the second driven gear is nonuniform.

6. The driving mechanism as claimed in claim 4, wherein the secondary driven gear is a secondary balancer rotating at twice the rotational speed of the engine so as to control the secondary vibration of the engine.

7. A driving mechanism for a motive vehicle having an engine, a crank shaft and a transmission, said mechanism comprising:
   (a) a balancer shaft disposed in the vicinity of and in parallel with the crank shaft, said balancer shaft being provided with a follower gear;
   (b) a pair of balance weight sections disposed on the crank shaft, said sections rotating to control the engine vibrations produced by the engine rotation;
   (c) a main shaft and a counter shaft disposed in the vicinity of and in parallel with the crank shaft, said main shaft being geared to the crank shaft;
   (d) a transmission disposed between the main shaft and the counter shaft, said transmission being connected operative with the main shaft and the counter shaft through a plurality of gears provided on both shafts having a range of gear diameters;
   wherein one of said pair of balance weight sections having a larger radius than the other balance weight section is disposed opposite to the gear of said plurality of gears on the main shaft having the smallest radius.

* * * * *

UNITED STATES PATENT AND TRADEMARK OFFICE
CERTIFICATE OF CORRECTION

PATENT NO. : 5,218,885
DATED : June 15, 1993
INVENTOR(S) : NAKANO et al.

It is certified that error appears in the above-identified patent and that said Letters Patent is hereby corrected as shown below:

In claim 6 (col. 12, l. 40) delete "secondary" and insert therefor -- second --.

Signed and Sealed this

Fifteenth Day of February, 1994

Attest:

BRUCE LEHMAN

Attesting Officer — Commissioner of Patents and Trademarks